United States Patent [19]

Trcka

[11] Patent Number: 4,958,248
[45] Date of Patent: Sep. 18, 1990

[54] REFLECTIVE TACHOMETER/HEADWHEEL ASSEMBLY FOR A ROTARY HEAD SCANNER

[75] Inventor: Milan V. Trcka, Pasadena, Calif.

[73] Assignee: Datatape Incorporated, Pasadena, Calif.

[21] Appl. No.: 286,426

[22] Filed: Dec. 19, 1988

[51] Int. Cl.$^5$ .......................... G11B 5/52; G11B 21/02
[52] U.S. Cl. .................................................. 360/107
[58] Field of Search ................................. 360/107, 108

[56] References Cited

U.S. PATENT DOCUMENTS

| | | | |
|---|---|---|---|
| 3,402,257 | 9/1968 | De Lange | 178/6.6 |
| 3,600,508 | 8/1971 | Dann et al. | 178/6.6 |
| 4,319,294 | 3/1982 | Repp | 360/107 |

Primary Examiner—Robert S. Tupper
Attorney, Agent, or Firm—William F. Noval

[57] ABSTRACT

For use in a helical scan magnetic tape record/reproduce apparatus, disclosed is a rotary head scanner including a reflective tachometer/headwheel assembly. The rotary head scanner includes a plurality of magnetic record/reproduce heads mounted on a headwheel which has a reflective tachometer disposed on one side of the headwheel. A radiation source and radiation sensor are located adjacent to the reflective tachometer. The radiation sensor senses radiation reflected from the tachometer and produces a signal which is a function of the rotational position and/or rotational speed of the headwheel.

3 Claims, 2 Drawing Sheets

REFLECTIVE TACHOMETER/HEADWHEEL ASSEMBLY FOR A ROTARY HEAD SCANNER

BACKGROUND OF THE INVENTION

This invention relates in general to magnetic tape record/reproduce apparatus and, more particularly, this invention relates to a helical scan magnetic tape record/reproduce apparatus having a rotary head scanner which includes a reflective tachometer/headwheel assembly.

Advanced magnetic tape recording and reproducing systems are required to store ever larger quantities of analog and digital information in ever smaller areas. In helical scan recording/reproducing equipment, a rotary head scanner having one or more magnetic heads records and reproduces inFormation in slant tracks on magnetic tape. Typically, a plurality oF magnetic record and reproduce heads are mounted on the periphery of a headwheel which rotates between upper and lower stationary drums. In order to accurately and reliably record and reproduce inFormation from magnetic tape, it is desirable that the rotational speed of the magnetic heads be kept constant. It is also desirable that a magnetic head properly track a recorded track on the tape so that an optimal signal is reproduced.

Servo systems which effect constant rotational speed of the headwheel of a rotary head scanner, utilize a separate tachometer which is mounted on the headwheel shaft at a distance from the headwheel. The tachometer may comprise a magnetic disk which is sensed by a magnetic pick-up head (see for example, U.S. Pat. No. 3,402,257, issued Sept. 17, 1968, entitled MAGNETIC RECORDING OF TELEVISION SIGNALS WITH PRERECORDED SYNC SIGNALS). The tachometer may also include an optically transparent disk having a light source and light sensor located on oPposite sides of the disk to sense circumferential marks on the disk (see U.S. Pat. No. 3,600,508, issued Aug. 17, 1971, entitled VIDEO TAPE RECORDER WITH EDITING FEATURE AND IMPROVED TAPE SPEED CONTROL). Although separate tachometer disks may be useful for the purposes for which they are intended, they disadvantageous in applications where sPace is at a premium. Thus, the separate disk and sensor assemblies take up space which increases the size of the rotary head assembly. It has also been ProPosed to incorporate into the headwheel carrying rotating magnetic heads, a transmission type tachometer disk. Such a device is disclosed in U.S. Pat. No. 4,319,294 issued Mar. 9, 1982, entitled MAGNETIC TAPE SCANNING DEVICE FOR RECORDING AND/OR REPRODUCING BAND SIGNALS. Although this device eliminates the necessity for a separate tachometer, such a design is disadvantageous, because separate assemblies must be provided on each side of the disk to support light sources and light sensors. Moreover, as shown in FiG. 3B of the latter patent, the conductors which extend from the magnetic heads mounted on the periphery of the disk tend to interfere with the tachometer markings and 25 may give a false indication of the rotational speed of the headwheel.

SUMMARY OF THE INVENTION

According to the present invention, there is provided in helical scan recording/reproducing apparatus a rotary head scanner having a headwheel/reflective tachometer assembly which obviates the disadvantages of the prior art. According to an aspect of the present invention, a rotary head scanner includes a headwheel having one or more magnetic heads mounted on the periphery of the headwheel and an optically reflective tachometer provided on a lower or upper side of the headwheel. A radiation source and radiation sensor are mounted on the same side as the reflective tachometer, thus eliminating the necessity for separate assemblies for the radiation sources and the radiation sensors. Thus, false rotational speed readings resulting from interference by electrical conductors in the optical sensor Path is eliminate

BRIEF DESCRIPTION OF THE DRAWINGS

In the detailed descriPtion of a Preferred embodiment of the invention present below, reference is made to the accompanying drawings in which like elements are numbered with like numbers.

DETAILED DESCRIPTION OF THE PREFERRED EMBODIMENT

Figure 1:
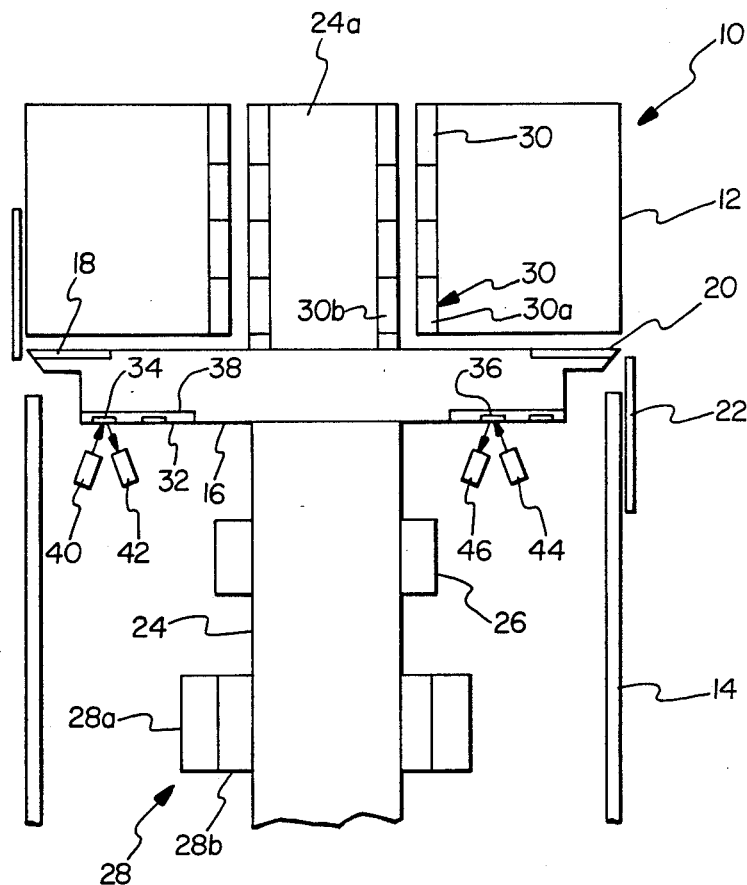
FIG. 1 is a diagrammatic, partially sectional view of a rotary head scanner incorporating an embodiment of the present invention.

Referring to FIG. 1, there is shown a rotary head scanner for use in a helical scan magnetic tape recording/reproducing apparatus. Rotary head scanner 10 includes upper and lower stationary drums 12 and 14 and a rotating headwheel 16 upon which are mounted a plurality of magnetic record/reproduce heads such as heads 18 and 20. Scanner 10 is mounted in a helical scan magnetic tape recording/reproducing apparatus in which a magnetic tape 22 is transported between supply and take-up reels (not shown), past scanner 10. Tape 22 is wrapped around scanner 10 in a helical path, so that, as headwheel 16 rotates, record/reproduce heads 18 and 20 record on and reProduce from slant tracks on tape 22. Headwheel 16 is rotatably mounted on shaft 24 which is supported in bearings 26. Shaft 24 is rotated at a constant speed by motor 28, which includes stator 28a and rotor 28b mounted on shaft 24. Electrical signals are transmitted to and from magnetic heads 18 and 20 by means of rotary transFormers 30 having stationary coils 30a and rotary coils 30b mounted on shaft extension 24a.

Figure 2:
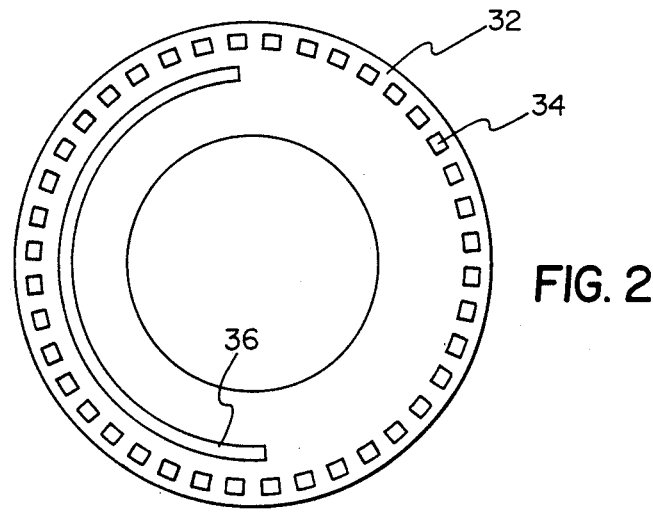
FIG. 2 is a plan view of the reflective tachometer used in the scanner of FIG. 1.

According to the present invention, a reflective tachometer 32 is provided on headwheel 16. As shown in FIG. 2, reflective tachometer 32 includes a first circumferential array of indicia 34 and a second circumferential array of indicia 36. Indicia 34 and 36 are of different reflective characteristics than immediately adjacent circumferential areas of tachometer 32.

Tachometer 32 is annular in shape and is bonded by a suitable adhesive in annular slot 38 in the lower side of headwheel 16.

A first radiation source 40 reflects radiation From the outer tachometer array of indicia 34 to first radiation sensor 42. A second radiation source 44 reflects radiation from the inner tachometer array of indicia 36 to second radiation sensor 46. As shaft 24 is rotated by motor 28, headwheel 16 and magnetic heads 18 and 20 are rotated at the same rotational speed. Tachometer 32 will also be rotated at the same rotational speed. Sensor 42 produces a signal which is representative of the rotational speed oF shaFt 24. This signal is used to precisely control the rotational speed of motor 28 and consequently magnetic heads 18 and 20. Sensor 46 produces a signal which is representative oF the rotational position oF headwheel 16 and magnetic heads 18 and 20. This signal may also be used to indicate the direction of rotation of headwheel 16 and to provide signals used to commutate motor 28 (which is preferably a brushless, direct current motor).

Figure 3:
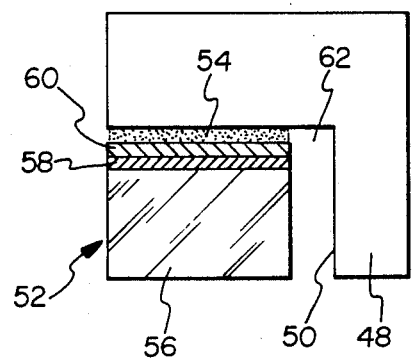
FIG. 3 is an alternate reflective tachometer arrangement.
Figure 4:
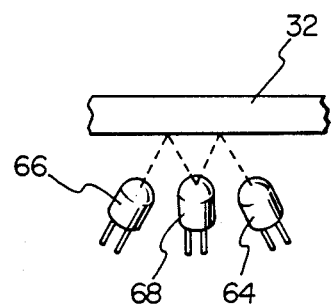
FIGS. 4 and 5 are alternate light-source/light-sensor arrangements which may be incorporated into the apparatus of FIG. 1.

Referring now to FIG. 3, there is shown a detail of a reflective tachometer which may be used in the apparatus oF FIG. 1. As shown, headwheel 48 has an annular slot 50. ReFlective tachometer assembly 52 is bonded in slot 50 by means of adhesive 54. Assembly 52 includes a clear glass ring 56 having a metalized layer 58 and a black absorbing layer 60. Layer 58 has alternate open areas to form a tachometer array (similar to the outer array of the reflective tachometer 32). A thermal expansion gap 62 is provided between headwheel 48 and assembly 52. In this arrangement, the reflective layer is protected by glass and, if broken, the assembly may be removed without having to discard the headwheel assembly. 25 Referring now to FIG. 4, there is shown an alternate arrangement oF radiation source and radiation sensors which may be used with the apparatus of FIG. 1. As shown, reflective tachometer 32 is irradiated by radiation sources 64 and 66 which reflect radiation from tachometer 32 to radiation sensor 68. Sensor 68 is located between sources 64 and 66. This arrangement provides higher radiation input to sensor 68 and a resultant higher level signal is produced by sensor 68.

Figure 5:
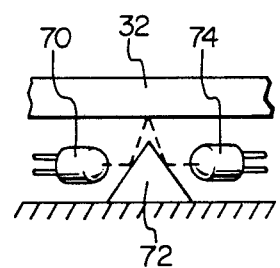

Referring to FIG. 5, there is shown another alternate arrangement of radiation source and radiation sensor which may be used in the apparatus of FIG. 1. As shown, reflective tachometer 32 is irradiated by means of a radiation source 70 which irradiates a reflective prism 72. Prism 72 reflects radiation to tachometer 32. Radiation reflected by tachometer 32 is reflected from the other side of reflective prism 72 and thence to radiation sensor 74.

The invention has been described in detail with reference to the Figures, however, it will be appreciated that variations and modifications are contemplated within the spirit and scope of the invention.

What is claimed is:

1. Rotary magnetic head scanner apparatus, comprising:
   a headwheel mounted for rotation about a rotational axis; wherein said headwheel has an annular slot on one side thereof;
   at least one magnetic head assembly mounted on the periphery of said headwheel;
   an annular reflective tachometer mounted in said annular slot on said one side of said headwheel; and
   a radiation source and a radiation sensor mounted on said one side of said headwheel, adjacent to said reflective which is reflected from said reflective tachometer to said radiation sensor, and wherein said sensor develops a signal, in response thereto, which is a function of the rotational position and/or rotational speed of said rotating magnetic heads.

2. The apparatus of claim 1 wherein said headwheel annular slot and said annular tachometer are dimensioned such that a thermal expansion gap is provided between said headwheel and said tachometer.

3. The apparatus of claim 1 including radiation reflecting means for reflecting radiation from said radiation source to said tachometer and for reflecting radiation reflected from said tachometer to said radiation sensor.

* * * * *

UNITED STATES PATENT AND TRADEMARK OFFICE
CERTIFICATE OF CORRECTION

PATENT NO.   : 4,958,248
DATED        : September 18, 1990
INVENTOR(S)  : Milan V. Trcka It is certified that error appears in the above-identified patent and that said Letters Patent is hereby corrected as shown below:

In column 4, line 23, after the first word "reflective" insert --tachometer, wherein said radiation source produces radiation...--.

Signed and Sealed this

Twenty-eighth Day of July, 1992

Attest:

DOUGLAS B. COMER

Attesting Officer

Acting Commissioner of Patents and Trademarks